US012586833B2

(12) United States Patent
Kim et al.

(10) Patent No.: US 12,586,833 B2
(45) Date of Patent: Mar. 24, 2026

(54) BATTERY PACK, ELECTRONIC DEVICE AND VEHICLE

(71) Applicant: LG ENERGY SOLUTION, LTD., Seoul (KR)

(72) Inventors: Jun-Suk Kim, Daejeon (KR); Seog-Jin Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 675 days.

(21) Appl. No.: 17/908,180

(22) PCT Filed: Jun. 10, 2021

(86) PCT No.: PCT/KR2021/007297
§ 371 (c)(1),
(2) Date: Aug. 30, 2022

(87) PCT Pub. No.: WO2021/256779
PCT Pub. Date: Dec. 23, 2021

(65) Prior Publication Data
US 2023/0129671 A1 Apr. 27, 2023

(30) Foreign Application Priority Data
Jun. 15, 2020 (KR) ......................... 10-2020-0072513

(51) Int. Cl.
*H01M 10/48* (2006.01)
*H01M 50/204* (2021.01)
*H01M 50/258* (2021.01)

(52) U.S. Cl.
CPC ....... *H01M 10/486* (2013.01); *H01M 50/204* (2021.01); *H01M 50/258* (2021.01); *H01M 2220/20* (2013.01)

(58) Field of Classification Search
CPC ............. H01M 10/486; H01M 50/204; H01M 50/258; H01M 2220/20; H01M 2220/30; H01M 50/20; H01M 10/613
See application file for complete search history.

(56) References Cited

U.S. PATENT DOCUMENTS 5,585,710 A 12/1996 Nakamura et al.
6,444,350 B1 * 9/2002 Toya ................... H01M 10/482
429/62

(Continued)

FOREIGN PATENT DOCUMENTS

EP 2711675 A1 3/2014
EP 3064916 A1 9/2016

(Continued)

OTHER PUBLICATIONS

Translation of KR 20140133861. (Year: 2014).*

(Continued)

*Primary Examiner* — Melvin C. Mayes
(74) *Attorney, Agent, or Firm* — Morgan, Lewis & Bockius LLP

(57) ABSTRACT

The present disclosure relates to a battery pack with improved safety through high reliability of temperature measurement of a plurality of battery cells. To achieve the above-described object, the battery pack includes a plurality of battery cells, a temperature sensor configured to measure a temperature of at least one of the plurality of battery cells, a module case configured to receive the plurality of battery cells therein and including a recessed space in which the temperature sensor is disposed, and a holder inserted into the recessed space of the receiving portion. The holder has a size that is large enough to fill at least part of the recessed space and is configured to hold the temperature sensor.

10 Claims, 9 Drawing Sheets

(56) References Cited

U.S. PATENT DOCUMENTS

| | | | |
|---|---|---|---|
| 7,033,074 B2 | 4/2006 | Ikeda et al. | |
| 8,980,452 B2 | 3/2015 | Hong et al. | |
| 10,629,965 B2 | 4/2020 | Lee et al. | |
| 2009/0041082 A1* | 2/2009 | Paramasivam | G01R 31/374 |
| | | | 374/208 |
| 2009/0130545 A1* | 5/2009 | Wood | H01M 10/6563 |
| | | | 429/90 |
| 2012/0127733 A1 | 5/2012 | Tomiyoshi et al. | |
| 2016/0204481 A1* | 7/2016 | Ryu | H02J 7/007194 |
| | | | 429/7 |
| 2016/0233561 A1* | 8/2016 | Lee | H01M 50/264 |
| 2016/0276720 A1* | 9/2016 | Steil | H01M 10/6555 |
| 2016/0380319 A1* | 12/2016 | Rhein | H01M 50/569 |
| | | | 429/90 |
| 2021/0364364 A1 | 11/2021 | Akaba et al. | |

FOREIGN PATENT DOCUMENTS

| | | | | |
|---|---|---|---|---|
| JP | H0875559 A | * | 9/1994 | |
| JP | H7-85896 A | | 3/1995 | |
| JP | H10-302847 A | | 11/1998 | |
| JP | 2004014171 A | | 1/2004 | |
| JP | 2004-259591 A | | 9/2004 | |
| JP | 2005-078858 A | | 3/2005 | |
| JP | 2010-287550 A | | 12/2010 | |
| JP | 4712929 B2 | | 6/2011 | |
| JP | 2013-171697 A | | 9/2013 | |
| JP | 2013171699 A | | 9/2013 | |
| JP | 2017-098171 A | | 6/2017 | |
| JP | 6535428 B1 | | 6/2019 | |
| KR | 10-2012-0059951 A | | 6/2012 | |
| KR | 10-2014-0113861 A | | 9/2014 | |
| KR | 10-2016-0085621 A | | 7/2016 | |
| KR | 10-2017-0027547 A | | 3/2017 | |
| KR | 10-2017-0052990 A | | 5/2017 | |

OTHER PUBLICATIONS

Japanese Office Action issued in corresponding JP Application No. 2022-538451 dated Jul. 18, 2023. Note: JP 2013-171697 A cited therein is already of record.

Office Action issued in corresponding Chinese Patent Application No. 202180008146.9, dated Jun. 28, 2024. (Note: JP 2013-171699 A, JP 2004-014171 A, JP 2013-171697 A were previously cited).

International Search Report (with partial translation) and Written Opinion dated Sep. 23, 2021, for corresponding International Patent Application No. PCT/KR2021/007297.

Office Action dated Jun. 27, 2025 issued in the corresponding Korean Patent Application No. 10-2020-0072513.

* cited by examiner

BATTERY PACK, ELECTRONIC DEVICE AND VEHICLE

TECHNICAL FIELD

The present disclosure relates to a battery pack, an electronic device and a vehicle, and more particularly, to a battery pack with improved safety through high reliability of temperature measurement of a plurality of battery cells.

The present application claims the benefit of Korean Patent Application No. 10-2020-0072513 filed on Jun. 15, 2020 with the Korean Intellectual Property Office, the disclosure of which is incorporated herein by reference in its entirety.

BACKGROUND ART

Recently, with the rapid increase in demand for portable electronic products such as laptop computers, video cameras and mobile phones and the extensive development of electric vehicles, accumulators for energy storage, robots and satellites, many studies are being made on high performance secondary batteries that can be repeatedly recharged.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

A lithium secondary battery primarily uses a lithium-based oxide and a carbon material as a positive electrode active material and a negative electrode active material respectively. Additionally, the lithium secondary battery includes an electrode assembly including a positive electrode plate and a negative electrode plate coated with the positive electrode active material and the negative electrode active material respectively with a separator interposed between the positive electrode plate and the negative electrode plate, and a packaging or a battery case in which the electrode assembly is hermetically received together with an electrolyte solution.

Additionally, lithium secondary batteries may be classified into can-type secondary batteries including the electrode assembly embedded in a metal can and pouch-type secondary batteries including the electrode assembly embedded in a pouch of an aluminum laminate sheet according to the shape of the packaging.

Among them, the can-type secondary battery may include a cylindrical metal can in which an electrode assembly is embedded. The can-type secondary battery may be used to manufacture a battery pack including a module case in which a plurality of secondary batteries is received and a busbar configured to electrically connect the plurality of secondary batteries.

Meanwhile, the battery pack according to the related art basically measures a temperature change during the charge/discharge of the plurality of secondary batteries to identify the operational condition or the life of the battery. Referring to FIG. 1, the battery pack according to the related art includes a plurality of secondary batteries 10, a module case 30 having a space H for receiving the plurality of secondary batteries 10, and a temperature sensor 40 to measure the temperature of the secondary batteries 10, and an adhesive 20 is added to fix the temperature sensor 40.

However, the related art directly inserts the temperature sensor into the receiving space of the module case with hands, so the insertion location is subjected to change. Moreover, when only the adhesive is used to fix the temperature sensor, before the adhesive is cured after it is applied, the position of the temperature sensor is easily changed by external impacts. Accordingly, it is difficult to install the temperature sensor and the secondary battery while keeping the distance between them constant each time the battery pack according to the related art is manufactured. Accordingly, the battery pack of the related art has a large difference between the actual temperature of the secondary battery and a temperature value measured through the temperature sensor. Accordingly, it is difficult to manage the life or safety of the secondary battery through temperature measurement of the battery pack.

DISCLOSURE

Technical Problem

The present disclosure is designed to solve the above-described problem, and therefore the present disclosure is directed to providing a battery pack with improved safety through high reliability of temperature measurement of a plurality of battery cells.

These and other objects and advantages of the present disclosure may be understood by the following description, and will be apparent from the embodiments of the present disclosure. In addition, it will be readily appreciated that the objects and advantages of the present disclosure may be realized by means and combinations thereof.

Technical Solution

To achieve the above-described object, a battery pack according to the present disclosure includes a plurality of battery cells, a temperature sensor configured to measure a temperature of at least one of the plurality of battery cells, a module case configured to receive the plurality of battery cells therein, and including a receiving portion having a recessed space in which the temperature sensor is received, and a holder inserted into the recessed space of the receiving portion, having a size that is large enough to fill at least part of the recessed space, and configured to hold the temperature sensor.

Additionally, the holder may have an insertion groove recessed from a part of a body, to which at least part of the temperature sensor is inserted and fixed.

Moreover, the battery pack may further include an adhesive configured to fill the recessed space of the receiving portion.

Furthermore, the holder may include a notch configured to form a gap with the temperature sensor, in which the adhesive is fed into a part of the insertion groove. Further, the holder may have a through-hole which runs in an inward direction, into which a part of the adhesive is fed into the holder.

Additionally, the holder may include a material having an ability to exhibit elastic recovery, and may be configured to press the temperature sensor against the battery cell by the elastic recovery after inserted into the recessed space of the receiving portion in a compressed state.

Moreover, the receiving portion may include a fixing rib which protrudes to guide a position of the holder, and a part of the holder may include a fixing groove recessed in corresponding size to the fixing rib, into which the fixing rib is inserted.

Furthermore, the fixing rib may protrude toward the temperature sensor to press a part of the holder to bring the temperature sensor fixed to the holder into close contact toward the battery cell.

Further, to achieve the above-described object, an electronic device according to the present disclosure includes at least one battery pack.

In addition, to achieve the above-described object, a vehicle according to the present disclosure includes at least one battery pack.

Advantageous Effects

According to an aspect of the present disclosure, the present disclosure includes the module case having the receiving portion and the holder which is inserted into the receiving portion, thereby stably fixing the temperature sensor in a constant position within the receiving portion. Accordingly, the battery pack of the present disclosure may be manufactured with a uniform distance between the battery cell and the temperature sensor, so the BMS may measure the temperature of the battery cell with high reliability. That is, since the distance between the battery cell and the temperature sensor is uniform, the BMS may estimate the actual temperature of the secondary battery with high reliability considering a predetermined temperature difference.

Additionally, according to an aspect of an embodiment of the present disclosure, the holder of the present disclosure includes a material having the ability to exhibiting elastic recovery, i.e., an elastic material, to press the temperature sensor against the battery cell by the elastic recovery after it is inserted into the recessed space of the receiving portion in a compressed state, thereby effectively keeping the temperature sensor in close contact with the battery cell. Accordingly, the present disclosure may effectively reduce the size of a temperature difference between the actual temperature of the battery cell and the temperature measured through the temperature sensor. Accordingly, the battery pack of the present disclosure may effectively increase the safety of the battery pack through the temperature measurement with fast response and high reliability.

Moreover, according to an aspect of the present disclosure, the present disclosure includes the fixing rib in the receiving portion, and the holder includes the fixing groove, thereby playing a role in fixing the position of the holder inserted into the receiving portion, and guiding the insertion of the holder in place without rotation for a uniform position of the temperature sensor. Accordingly, it is possible to prevent the non-uniform position of the temperature sensor due to the non-uniform insertion position of the holder in the process of manufacturing the plurality of battery packs. Accordingly, the battery pack may effectively increase the safety of the battery pack through the temperature measurement with high reliability.

BRIEF DESCRIPTION OF THE DRAWINGS

The accompanying drawings illustrate the preferred embodiments of the present disclosure, and together with the following detailed description, serve to provide a further understanding of the technical aspect of the present disclosure. However, the present disclosure should not be construed as being limited to the drawings.

DETAILED DESCRIPTION

Figure 1:
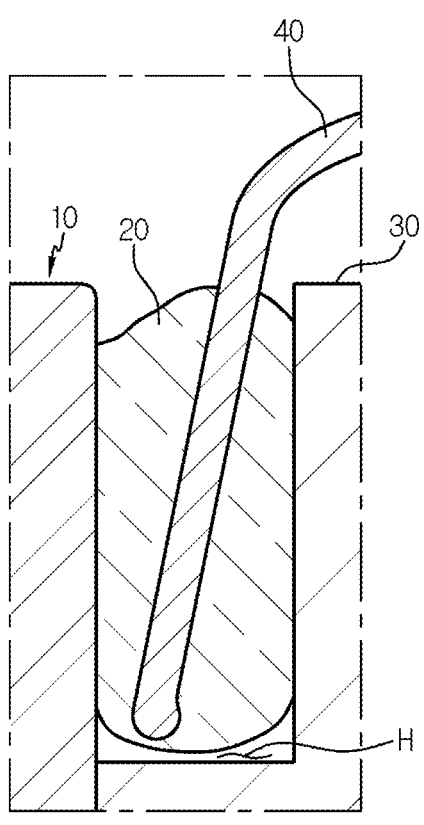
FIG. 1 is a schematic partial cross-sectional view of a battery pack according to the related art.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and the illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
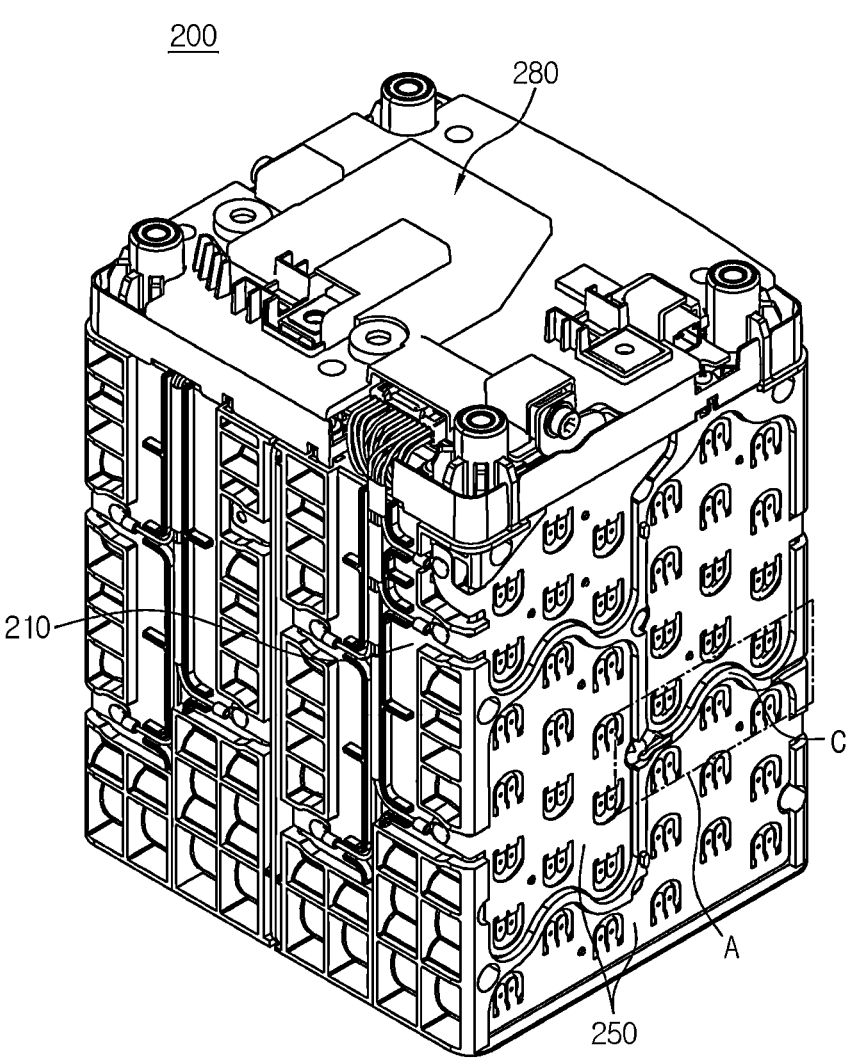
FIG. 2 is a schematic perspective view of a battery pack according to an embodiment of the present disclosure.
Figure 3:
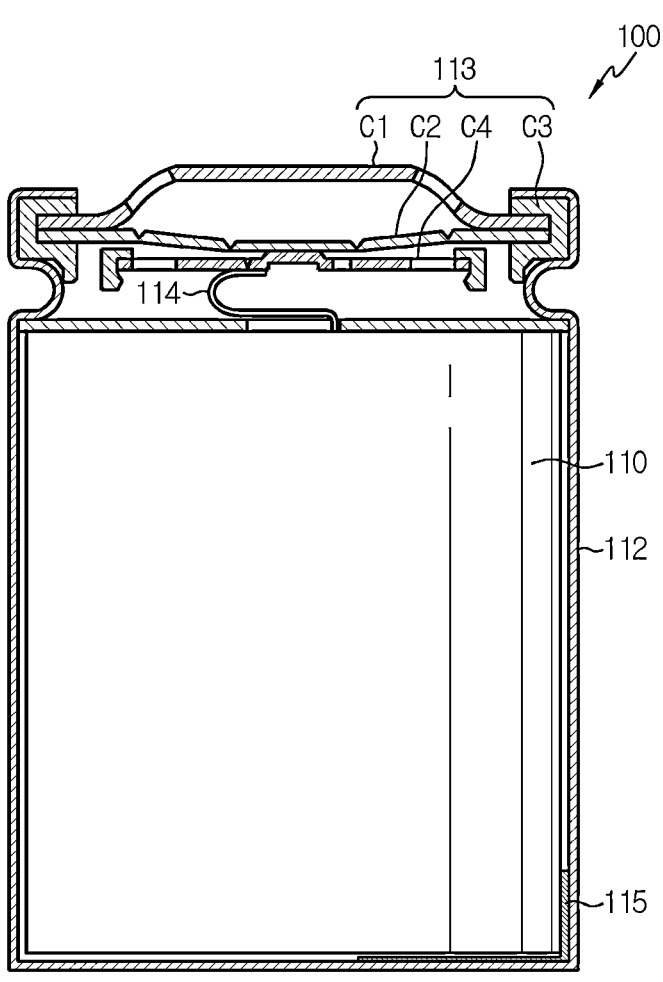
FIG. 3 is a schematic cross-sectional view of a battery cell of a battery pack according to an embodiment of the present disclosure.
Figure 4:
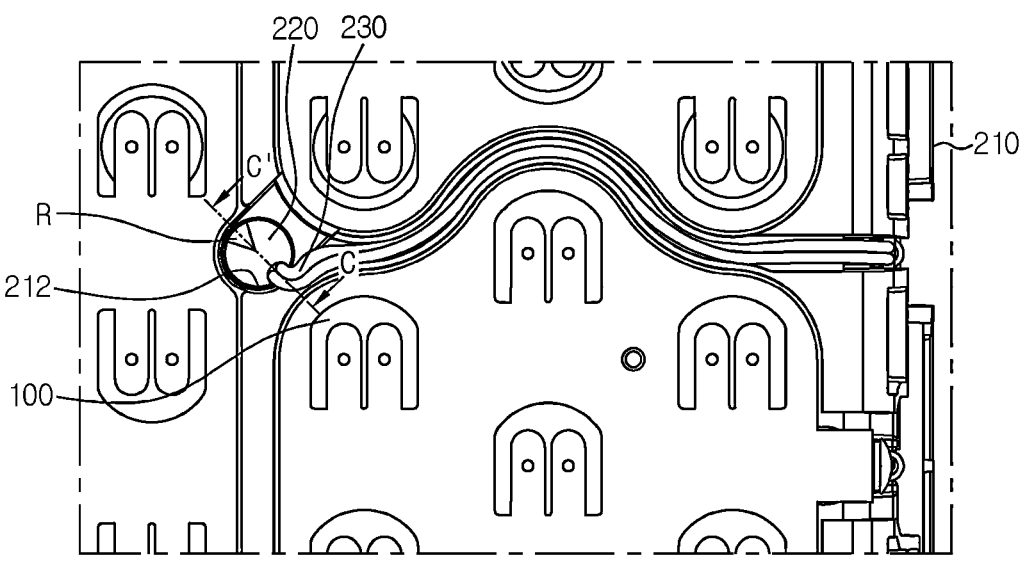
FIG. 4 is a schematic partial enlarged perspective view of section A in FIG. 2, showing a battery pack.

FIG. 2 is a schematic perspective view of a battery pack according to an embodiment of the present disclosure. FIG. 3 is a schematic cross-sectional view of a battery cell of the battery pack according to an embodiment of the present disclosure. Additionally, FIG. 4 is a schematic partial enlarged perspective view of section A in FIG. 2, showing the battery pack. In FIG. 4, for convenience of description, a part C of a module case that covers a temperature sensor 230 is removed to show the temperature sensor 230.

Referring to FIGS. 2 to 4, the battery pack 200 of the present disclosure includes a plurality of battery cells 100, a module case 210 and a holder 220.

Here, the plurality of battery cells 100 may be a rechargeable secondary battery. The battery cell 100 may be a can-type battery cell 100. Here, the battery cell 100 may include an electrode assembly 110, a cylindrical battery can 112 and a cap assembly 113.

The electrode assembly 110 may have a structure in which a positive electrode plate and a negative electrode plate are wound with a separator interposed between, a positive electrode tab 114 may be attached to the positive electrode plate and connected to the cap assembly 113, and a negative electrode tab 115 may be attached to the negative electrode plate and connected to the bottom of the battery can 112.

The battery can 112 may have an empty internal space in which the electrode assembly 110 is received. In particular, the battery can 112 may be cylindrical or prismatic, and may have an open top. Additionally, the battery can 112 may be made of a metal such as steel or aluminum to ensure the strength. Additionally, the battery can 112 may have the negative electrode tab attached to the bottom, and thus the bottom of the battery can 112 as well as the battery can 112 it may act as a negative electrode terminal.

The cap assembly 113 may be coupled to the open top of the battery can 112 to close the battery can 112. The cap assembly 113 may have a circular or prismatic shape according to the shape of the battery can 112, and may include a sub-component such as a top cap C1, a safety vent C2 and a gasket C3.

Here, the top cap C1 may be disposed at the topmost side of the cap assembly 113, and configured to protrude upward. In particular, the top cap C1 may act as a positive electrode terminal in the battery cell 100. Accordingly, the top cap C1 may be electrically connected to another battery cell 100 through an external device, for example, a busbar 250. The top cap C1 may be made of, for example, a metal such as stainless steel or aluminum.

The safety vent C2 may be configured to change the structure when the internal pressure of the battery cell 100, i.e., the internal pressure of the battery can 112 increases above a predetermined level. Additionally, the gasket C3 may be made of a material having the electrically insulating property to isolate the edge of the top cap C1 and the safety vent C2 from the battery can 112.

Meanwhile, the cap assembly 113 may further include a current cutoff element C4. The current cutoff element C4 is also known as a Current Interrupt Device (CID), and when the internal pressure of the battery increases by gas generation and the shape of the safety vent C2 changes conversely, the contact between the safety vent C2 and the current cutoff element C4 may be broken or the current cutoff element C4 may be blown off, to disconnect the electrical connection between the safety vent C2 and the electrode assembly 110.

The configuration of the battery cell 100 is well known to those skilled in the art at the time of filing the patent application, and its detailed description is omitted herein. Additionally, although FIG. 3 shows an example of the battery cell 100, the battery pack 200 according to the present disclosure is not limited to a configuration of a particular type of battery cell 100. That is, the battery pack 200 according to the present disclosure may include various types of battery cells 100 well-known at the time of filing the patent application.

Additionally, the battery pack 200 of the present disclosure may further include a plurality of busbars 250. The busbar 250 may be configured to establish an electrical connection between the plurality of cylindrical battery cells 100. The busbar 250 may include an electrically conductive metal. The busbar 250 may include, for example, at least one of copper, nickel or aluminum.

Moreover, the busbar 250 may be mounted on the left or right side of the module case 210. For example, as shown in FIG. 2, four busbars may be mounted on the right side of the battery pack 200. Although not shown, a plurality of busbars may be embedded in the left side of the battery pack 200 and inside the module case 210.

FIG. 4 is a schematic partial enlarged perspective view of the battery pack of FIG. 2.

Referring to FIG. 4 together with FIGS. 2 and 3, the temperature sensor 230 may act as a sensor to convert heat into an electrical signal. The temperature sensor 230 may be, for example, a thermistor that changes in resistance value with changes in temperature. The thermistor may include an electrically insulating coating.

Moreover, the module case 210 may include an electrically insulating material. For example, the module case 210 may include polyvinyl chloride. The module case 210 may have a box-shaped body as a whole. Additionally, the module case 210 may have a plurality of holes of the body to receive the plurality of battery cells 100 therein. Further, the module case 210 may include a receiving portion 212 having a recessed space in which the temperature sensor 230 is received. For example, the receiving portion 212 may have a cylindrical internal space as shown in FIG. 4.

Moreover, the holder 220 may be configured to be inserted into the recessed space of the receiving portion 212. The holder 220 may have a size that is large enough to fill at least part of the recessed space of the receiving portion 212.

Additionally, the holder 220 may be configured to hold the temperature sensor 230. That is, the holder 220 may hold a part of the temperature sensor 230. That is, the holder 220 may be configured to fix the temperature sensor 230 to prevent the temperature sensor 230 from moving or escaping. The holder 220 may have a variety of holding structure of fixing the temperature sensor 230 according to the shape of the temperature sensor 230.

According to this configuration of the present disclosure, the present disclosure includes the module case 210 having the receiving portion 212 and the holder 220 which is inserted into the receiving portion 212, thereby stably fixing the temperature sensor 230 in a constant position within the receiving portion 212. Accordingly, the battery pack 200 of the present disclosure may be manufactured with a uniform distance between the battery cell 100 and the temperature sensor 230, so the BMS 280 may measure the temperature of the battery cell 100 with high reliability. That is, since the distance between the battery cell 100 and the temperature sensor 230 is uniform, the BMS 280 may estimate the actual temperature of the secondary battery with high reliability considering a predetermined temperature difference.

Figure 5:
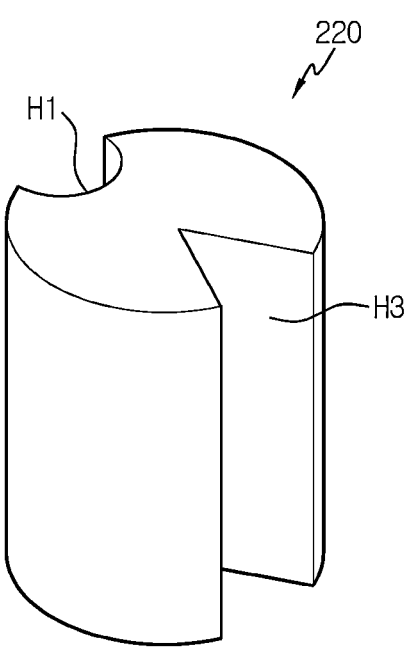
FIG. 5 is a schematic perspective view of a holder of a battery pack according to an embodiment of the present disclosure.

FIG. 5 is a schematic perspective view of the holder of the battery pack according to an embodiment of the present disclosure. Additionally, FIG. 6 is a schematic partial perspective view of the holder and the temperature sensor of the battery pack according to an embodiment of the present disclosure.

Figure 6:
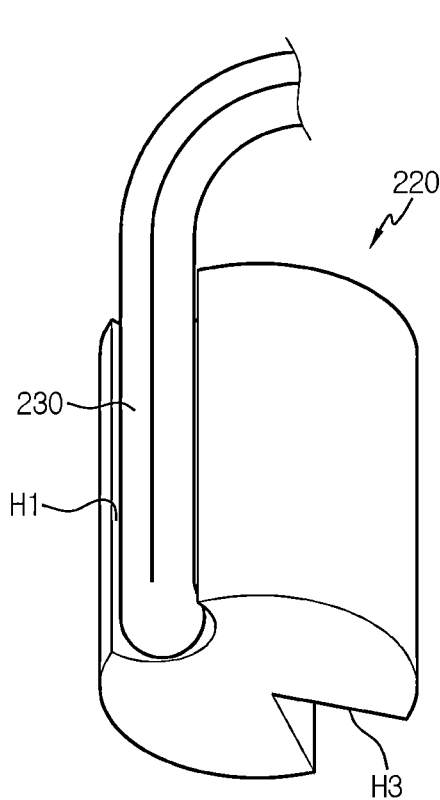
FIG. 6 is a schematic partial perspective view of a holder and a temperature sensor of a battery pack according to an embodiment of the present disclosure.

Referring to FIGS. 5 and 6 together with FIGS. 3 and 4, the holder 220 may have an insertion groove H1 configured to fix the temperature sensor 230. The insertion groove H1 may be recessed inward from a part of the body, into which at least part of the temperature sensor 230 is inserted. For example, as shown in FIG. 5, the insertion groove H1 may have a groove shape extending in a direction (toward the inner center of the battery pack) along the body of the temperature sensor 230.

According to this configuration of the present disclosure, the present disclosure includes the insertion groove H1 recessed from a part of the body, to which at least part of the temperature sensor 230 is inserted and fixed, thereby placing the temperature sensor 230 at a predetermined distance from the battery cell 100 along the direction in which the battery cell 100 extends. Ultimately, the present disclosure may solve the problem with a temperature difference between the measured temperature and the actual temperature of the battery cell 100 due to the inconstant position of the temperature sensor 230 each time the battery pack is manufactured.

Figure 7:
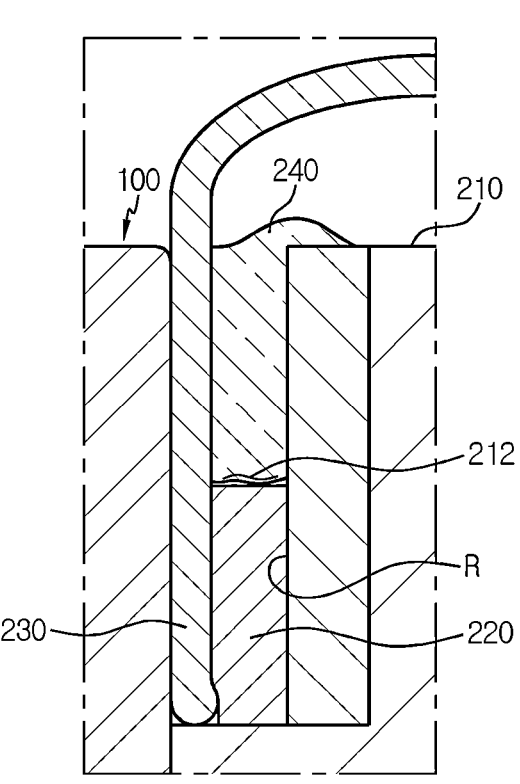
FIG. 7 is a schematic partial cross-sectional view of FIG. 2, taken along the line C-C', showing the internal configuration of the components of a battery pack according to another embodiment of the present disclosure.

FIG. 7 is a schematic partial cross-sectional view of FIG. 4, taken along the line C-C', showing the internal configuration of the components of the battery pack according to another embodiment of the present disclosure.

Referring to FIG. 7 together with FIGS. 4 to 6, a part of the receiving portion 212 of the battery pack according to another embodiment of the present disclosure may be opened to expose a part of the battery cell 100 received in the module case 210. That is, the receiving portion 212 may have an open part of the wall of the internal space in a direction in which the battery cell 100 is positioned to bring a part of the inserted temperature sensor 230 and the battery cell 100 into contact with each other.

Additionally, the battery pack according to another embodiment of the present disclosure may further include an adhesive 240 configured to fill the recessed space of the receiving portion 212. Specifically, the adhesive 240 may be solidified after it is fed into the internal space of the receiving portion 212. The adhesive 240 may be transparent and electrically insulating. The adhesive 240 may be a glue or a hot-melt resin. For example, the adhesive 240 may include at least one of a polyamide-based resin, a polyimide-based resin, an epoxy-based resin or an acrylic resin.

Additionally, the adhesive 240 may be configured to fix the position of the temperature sensor 230 and the holder 220. That is, the adhesive 240 may fix a part of the temperature sensor 230 and a part of the holder 220.

According to this configuration of the present disclosure, the present disclosure includes the adhesive 240, to firmly fix the position of the temperature sensor 230 and the holder 220, thereby preventing the temperature sensor 230 from changing the position or escaping due to external impacts while the battery pack 200 is in use afterwards. Accordingly, the battery pack 200 may measure the temperature of the battery cell 100 with high reliability, thereby effectively increasing the safety of the battery pack 200.

Figure 8:
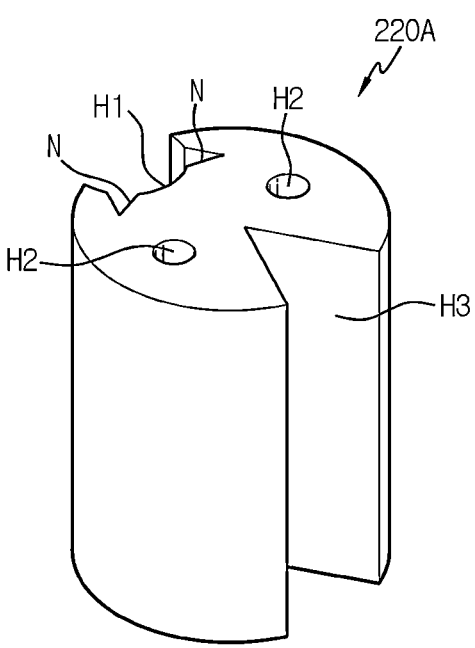
FIG. 8 is a schematic perspective view of a holder of a battery pack according to another embodiment of the present disclosure.

FIG. 8 is a schematic perspective view of the holder of the battery pack according to another embodiment of the present disclosure.

Referring to FIG. 8 together with FIGS. 4 to 7, when compared with the holder 220 of FIG. 5, the holder 220A of the battery pack according to another embodiment of the present disclosure may further include a notch N. That is, in the same way as the holder 220 of FIG. 5, the holder 220A of FIG. 8 may be configured to fix the temperature sensor 230 to the insertion groove H1.

Additionally, the notch N may form a gap with the temperature sensor 230, into which the adhesive 240 is fed. The notch N may be formed in a part of the insertion groove H1. The notch N may extend along the body of the temperature sensor 230.

That is, the notch N may have a triangular shape on the plane, and may have a groove shape extending inward along the body of the temperature sensor 230.

Additionally, the adhesive 240 may be fed into the holder 220 along the internal space of the notch N. The adhesive 240 fed into the internal space of the notch N may be configured to contact the outer surface of the temperature sensor 230. Additionally, the adhesive 240 may be configured to solidify in a predetermined time after it is fed into the notch N in a liquid state.

According to this configuration of the present disclosure, the holder 220A of the present disclosure further includes the notch N, so the adhesive 240 may be fed along the notch N and come into contact with the temperature sensor 230. That is, the notch N may allow the adhesive 240 to be fed into the holder 220A, thereby fixing a larger area of the temperature sensor 230.

Accordingly, the present disclosure may fix a part of the temperature sensor 230 inserted into the insertion groove H1 of the holder 220A with the adhesive 240, thereby preventing the temperature sensor 230 from changing the position or escaping due to external impacts while the battery pack 200 is in use afterwards. Accordingly, the battery pack 200 may measure the temperature of the battery cell 100 with high reliability, thereby effectively increasing the safety of the battery pack 200.

Referring to FIG. 8 together with FIGS. 4 to 7, when compared with the holder 220 of FIG. 5, the holder 220A of the battery pack according to another embodiment of the present disclosure may further include a through-hole H2.

Additionally, the through-hole H2 may be configured to feed a part of the adhesive 240 into the holder 220A. The through-hole H2 may have a shape through which a part of the body of the holder 220A passes in the inward direction (toward the inner center of the battery pack). That is, the adhesive 240 may move from one outer surface of the holder 220A to the other inner surface on the opposite side through the through-hole H2. For example, as shown in FIG. 8, the holder 220A may include two through-holes H2. Each of the two through-holes H2 may pass through from the upper surface to the lower surface on the basis of the holder 220A shown in FIG. 8.

According to this configuration of the present disclosure, the holder 220A of the present disclosure includes the through-hole H2, along which the adhesive 240 may be fed into the holder 220A. The adhesive 240 fed into the holder 220A may fix the holder 220A, and the adhesive 240 may be fed into the inner part of the holder 220A (on the basis of the center of the module case 210) where it was difficult for the adhesive 240 to reach, thereby stably fixing the position of the holder 220A.

Accordingly, it is possible to prevent the holder 220A from changing the position in the receiving portion 212 or moving out of the receiving portion 212 due to external impacts while the battery pack 200 is in use afterwards. Accordingly, since the battery pack 200 stably fixes the temperature sensor 230 in the receiving portion 212, it is possible to measure the temperature of the battery cell 100 with high reliability.

Referring back to FIGS. 5 to 7, the holder 220 of the battery pack 200 according to an embodiment of the present disclosure may include a material having the ability to exhibit elastic deformation or elastic recovery enough to fill a part of the recessed space of the receiving portion 212. The material may be, for example, at least one of silicone, urethane, rubber or a sponge.

Additionally, the holder 220 may be inserted into the recessed space of the receiving portion 212 in a compressed state. The holder 220 may be configured to press the temperature sensor 230 against the battery cell 100 by elastic recovery after it is inserted into the recessed space of the receiving portion 212. For example, the holder 220 may include urethane. The holder 220 may bring the temperature sensor 230 fixed to the insertion groove H1 and the battery cell 100 into close contact with each other by the elastic recovery of the urethane. That is, the holder 220 may be configured to press the temperature sensor 230 against the battery cell 100 when it is inserted into the receiving portion 212.

According to this configuration of the present disclosure, the holder 220 of the present disclosure includes a material having the ability to exhibiting elastic recovery, i.e., an elastic material, to press the temperature sensor 230 against the battery cell 100 by the elastic recovery after it is inserted into the recessed space of the receiving portion 212 in a compressed state, thereby effectively keeping the temperature sensor 230 in close contact with the battery cell 100.

Accordingly, the present disclosure may effectively reduce the size of a temperature difference between the actual temperature of the battery cell 100 and the temperature measured through the temperature sensor 230. Accordingly, the battery pack 200 of the present disclosure may effectively increase the safety of the battery pack 200 through the temperature measurement with fast response and high reliability.

Referring back to FIGS. 5 to 7, the receiving portion 212 of the battery pack 200 according to an embodiment of the present disclosure may include a fixing rib R protruding to guide the position of the holder 220. The fixing rib R may have a protruding shape from a part of the recessed space of the receiving portion 212 toward the holder 220. The fixing rib R may be configured to be inserted into a part of the holder 220 to fix the position of the holder 220.

Additionally, the holder 220 may include a fixing groove H3 into which the fixing rib R is inserted. The fixing groove H3 may have a recessed shape that allows a part of the holder 220 to be inserted into the body. The fixing groove H3 may have a recessed space of a corresponding size to the fixing rib R.

Moreover, the fixing rib R may have a shape with the protrusion size gradually increasing as it goes in the inward direction of the receiving portion 212. For example, when the fixing rib R has a wedge shape, the wedge size may be configured to gradually increase as it goes in the inward direction of the recessed space of the receiving portion 212. Accordingly, due to the gradually increasing shape of the fixing rib R, as the holder 220 is inserted into the receiving portion 212, the holder 220 may compress the temperature sensor 230 more strongly by the fixing rib R.

According to this configuration of the present disclosure, the present disclosure includes the fixing rib R in the receiving portion 212 and the fixing groove H3 in the holder 220, thereby playing a role in fixing the position of the holder 220 inserted into the receiving portion 212 and guiding the insertion of the holder 220 in place without rotation of the position of the holder 220 when inserting the holder 220. Accordingly, it is possible to prevent changes in the position of the temperature sensor 230 due to the varying insertion position of the holder 220 in the process of manufacturing the plurality of battery packs 200. Accordingly, the battery pack 200 may effectively increase the safety of the battery pack 200 through the temperature measurement with high reliability.

Additionally, the fixing rib R may be configured to press a part of the holder 220 to bring the temperature sensor 230 fixed to the holder 220 and the battery cell 100 into close contact. That is, the fixing rib R may have a protruding shape toward the temperature sensor 230. That is, the protruded end of the fixing rib R toward the temperature sensor 230 may compress the holder 220 against the temperature sensor 230, and the compressed holder 220 may bring the temperature sensor 230 and the outer surface of the battery cell 100 into close contact.

According to this configuration of the present disclosure, the present disclosure includes the fixing rib R protruding toward the temperature sensor 230, thereby stably keeping the temperature sensor 230 in close contact with the outer surface of the battery cell 100. Accordingly, the battery pack 200 may effectively increase the safety of the battery pack 200 through the temperature measurement with high reliability.

Meanwhile, a battery pack 200 according to an embodiment of the present disclosure may further include various types of devices (not shown) for controlling the charge/discharge of the battery pack 200, for example, the BMS 280 (FIG. 1), a current sensor, the temperature sensor 230 and a fuse.

Meanwhile, an electronic device (not shown) according to an embodiment of the present disclosure includes at least one battery pack 200. The electronic device may further include a device housing (not shown) having a receiving space for receiving the battery pack 200 and a display unit to allow a user to see the state of charge of the battery pack 200.

Additionally, the battery pack 200 according to an embodiment of the present disclosure may be included in a vehicle such as an electric vehicle or a hybrid electric vehicle. That is, the vehicle according to an embodiment of the present disclosure may include at least one battery pack 200 according to an embodiment of the present disclosure mounted in the vehicle body.

Meanwhile, the terms indicating directions as used herein such as upper, lower, left, right, front and rear are used for convenience of description only, and it is obvious to those skilled in the art that the term may change depending on the position of the stated element or an observer.

Hereinafter, the present disclosure is described in more detail through embodiments and experimental examples, but the present disclosure is not limited to these embodiments and experimental examples. The embodiment according to the present disclosure may be modified in many different forms, and the scope of the present disclosure should not be interpreted as being limited to the disclosed embodiments. The embodiments of the present disclosure are provided to give a full and complete description of the present disclosure to those skilled in the art.

Comparative Example 1

Figure 9:
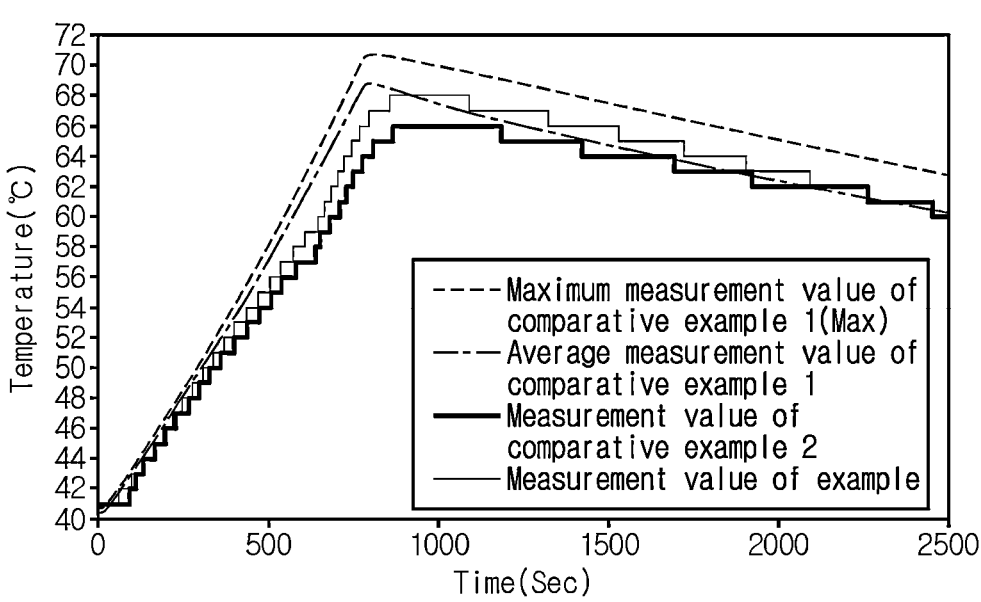
FIG. 9 is a graph showing the temperature measurement results of example of the present disclosure, comparative example 1 and comparative example 2.

The battery pack of the present disclosure includes a total of 84 cylindrical battery cells received in the module case. The 84 cylindrical battery cells are divided into six groups, each group including 14 cylindrical battery cells electrically connected in series with each other, and the six groups are electrically connected in parallel. Among the battery cells received in the module case, the temperature of twenty battery cells disposed at the center and peripheral areas of the module case is directly measured using a temperature measuring machine (a thermal coupler) to measure the internal temperature of the module case. The maximum value and the average of the measured temperatures are shown in the graph of FIG. 9.

Comparative Example 2

After the holder which fixes a temperature sensor (a negative temperature coefficient (NTC) thermistor) is inserted into the receiving portion of the same battery pack as comparative example 1 such that the temperature sensor is inserted in close contact with the outer surface of the cylindrical battery cell, the temperature of the battery cell measured through the temperature sensor is calculated through the BMS. The measured temperatures are shown in the graph of FIG. 9.

Example

After the holder fixing a temperature sensor (an NTC thermistor) to the receiving portion of the same battery pack as comparative example 1 is inserted in close contact of the temperature sensor with the outer surface of the cylindrical battery cell, the temperature of the battery cell measured through the temperature sensor is calculated through the BMS. The measure temperatures are shown in the graph of FIG. 9.

As a result of measurement, the battery pack of comparative example 2 having no holder shows a difference of about 4° C. on the basis of the maximum temperature value among 20 battery cells directly measured using the temperature measuring machine in comparative example 1. In contrast, the battery pack of the example of the present disclosure shows a small difference of about 2° C. Accordingly, the battery pack of the present disclosure may effectively reduce the size of a temperature difference between the actual temperature of the battery cell and the temperature measured through the temperature sensor. Accordingly, the battery pack of the present disclosure may effectively increase the safety of the battery pack through the temperature measurement with high reliability.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. A battery pack, comprising:
   a plurality of cylindrical battery cells, each cylindrical battery cell being vertically arranged with a first terminal at a top end and a second terminal at a bottom end;
   a temperature sensor configured to measure a temperature of at least one of the plurality of cylindrical battery cells;
   a module case configured to receive the plurality of cylindrical battery cells therein, and including a recessed space defined between respective ones of the cylindrical battery cells and in which the temperature sensor is disposed; and
   a holder inserted into the recessed space, the holder having a size that is large enough to fill at least part of the recessed space and configured to hold the temperature sensor,
   wherein the holder has an insertion groove recessed along a vertical length of the holder, at least part of the temperature sensor is inserted and fixed into the insertion groove along a vertical length of the holder, and
   wherein the holder includes a notch defining a groove extending inward along a vertical length of the holder and configured to form a gap with the temperature sensor.

2. The battery pack according to claim 1, further comprising:
   an adhesive filling the recessed space.

3. The battery pack according to claim 2, wherein the adhesive is fed into the notch to fix the temperature sensor to a part of the insertion groove.

4. The battery pack according to claim 1, wherein the holder includes a material having an ability to exhibit elastic recovery, and is configured to press the temperature sensor against a respective one of the cylindrical battery cells by an elastic recovery after being inserted into the recessed space in a compressed state.

5. The battery pack according to claim 1, wherein the module case includes a fixing rib that protrudes into the recessed space to guide a position of the holder, and
   wherein a part of the holder includes a fixing groove recessed in corresponding size to the fixing rib, into which the fixing rib is inserted.

6. The battery pack according to claim 5, wherein the fixing rib protrudes toward the temperature sensor to press a part of the holder to bring the temperature sensor fixed to the holder into close contact toward a respective one of the cylindrical battery cells.

7. The battery pack according to claim 1, wherein the holder includes an elastic material, the holder directly contacting the temperature sensor to press the temperature sensor in a width direction against a respective one of the cylindrical battery cells.

8. A vehicle comprising at least one battery pack according to claim 1.

9. A battery pack, comprising:
   a plurality of cylindrical battery cells, each cylindrical battery cell being vertically arranged with a first terminal at a top end and a second terminal at a bottom end;
   a temperature sensor configured to measure a temperature of at least one of the plurality of cylindrical battery cells;
   a module case configured to receive the plurality of cylindrical battery cells therein, and including a recessed space defined between respective ones of the cylindrical battery cells and in which the temperature sensor is disposed;
   a holder inserted into the recessed space, the holder having a size that is large enough to fill at least part of the recessed space and configured to hold the temperature sensor; and
   an adhesive filling the recessed space,
   wherein the holder has an insertion groove recessed along a vertical length of the holder, at least part of the temperature sensor is inserted and fixed into the insertion groove along a vertical length of the holder, and
   wherein the holder has a through-hole which runs in an inward direction, a part of the adhesive is fed through the through-hole into the holder.

10. A battery pack, comprising:
   a plurality of battery cells;
   a temperature sensor configured to measure a temperature of at least one of the plurality of battery cells;
   a module case configured to receive the plurality of battery cells therein, and including a recessed space in which the temperature sensor is disposed; and
   a holder configured to hold the temperature sensor, the holder being inserted into the recessed space and having a size that to fill the recessed space in a width direction of the recessed space at least at part of the recessed space,
   wherein the holder includes an elastic material, the holder directly contacting the temperature sensor to press the temperature sensor in the width direction against a respective one the battery cells,
   wherein the holder has an insertion groove recessed along a vertical length of the holder, at least part of the temperature sensor is inserted and fixed into the insertion groove along an entire vertical length of the holder, and wherein the holder includes a notch defining a groove extending inward along the vertical length of the holder and configured to form a gap with the temperature sensor.

* * * * *